United States Patent [19]
Sink

[11] 3,763,977
[45] Oct. 9, 1973

[54] BRAKE WITH TORQUE LIMITING COUPLING
[75] Inventor: William Howard Sink, Auburn, Ind.
[73] Assignee: Dana Corporation, Toledo, Ohio
[22] Filed: Sept. 13, 1972
[21] Appl. No.: 288,854

[52] U.S. Cl. .................. 192/7, 188/71.2, 192/13 R, 192/18 R
[51] Int. Cl. ............................................ F16d 67/02
[58] Field of Search .................. 192/7, 13 R, 18 R; 188/71.2

[56] References Cited
UNITED STATES PATENTS
| | | | |
|---|---|---|---|
| 3,550,727 | 12/1970 | McCain | 192/7 X |
| 2,540,965 | 2/1951 | Schellinger | 192/52 X |
| 1,508,827 | 9/1924 | Valiquet | 192/7 |

Primary Examiner—Benjamin W. Wyche
Assistant Examiner—Lance W. Chandler
Attorney—Walter E. Pavlick et al.

[57] ABSTRACT

A clutch brake assembly is provided for use with heavy-duty non-synchronized transmission having a limited torque feature incorporated therein. This feature is accomplished by resilient means in the form of a pair of pre-loaded Belleville washers located intermediate an outer friction section and an inner brake section. The inner brake section has tangs for drivingly engaging splines of keyways on the transmission driven shaft and also has a lost motion coupling connection with the Belleville washers. The Belleville washers in turn have a controlled frictional driving engagement with the outer friction section. With this arrangement, the Belleville washers function to positively control the torque applied to the inner brake section so that the tang and spline connection between the inner brake member and the transmission driven shaft is protected from damage by allowing the inner brake section to slip relative to the outer friction section when excessive braking pressure is applied to the outer friction section of the clutch brake by a vehicle operator.

10 Claims, 3 Drawing Figures

PATENTED OCT 9 1973 3,763,977

3,763,977

BRAKE WITH TORQUE LIMITING COUPLING

BACKGROUND OF THE INVENTION

1. Field of the Invention

The invention relates generally to friction clutches of the type used in automotive vehicles and more particularly to a clutch brake for heavy-duty transmissions which is activated upon clutch disengagement to retard and stop rotation of the transmission gearing so that a gear shifting operation can take place.

2. Description of the Prior Art

It is well known in the art to have a clutch brake activated by the throw-out mechanism upon disengagement of the main clutch of a motor vehicle in order to stop the transmission drive gear preliminary to a gear shifting operation.

Numerous braking arrangements of this general type are shown in the prior art, e.g., U.S. Pat. Nos. 1,684,471 and 2,511,133.

It has also been proposed to include a resilient means in such arrangements which functions to cushion the braking effect of the clutch brake so that excessive application of braking pressure is not applied to the clutch brake to damage or cause the same to become inoperative. Such devices are shown in U.S. Pat. Nos. 1,828,423 and 1,885,516.

While the latter devices have provided satisfactory means for minimizing the effects of wear and breakage of the spline connection in clutch brakes of this type, the disadvantage of being made up of a number of individual parts requires the altering of both the clutch throw-out mechanism and also the transmission housing in order to function properly.

SUMMARY OF THE INVENTION

The objects and advantages of the present invention are achieved by an improved clutch brake assembly wherein an inner brake section has tangs for positively drivingly engaging splines on the transmission drive gear, an outer friction section enclosing the inner brake section and a resilient means which is employed for operatively connecting the inner brake section and outer friction section. The resilient means is adapted to be compressed in a preloaded condition and is positioned so as to be frictionally coupled with the outer friction section while being positively coupled to the inner brake section through a lost motion connection which provides limited free travel to reduce torsional pounding of the tangs when the inner brake section rides unloaded on the transmission driven shaft, i.e. with the main clutch engaged. The friction coupling connection between the resilient means and the outer friction section is provided so that slip can occur therebetween when excessive braking force is applied to the clutch brake.

Accordingly, it is an object of the present invention to provide a clutch brake assembly having a limited torque feature which protects the drive tangs by limiting the torsional loads applied on the tangs.

A further object of the present invention is to provide a unitary clutch brake assembly which is constructed in separate parts so that a very small mass of the overall assembly is connected directly to the drive tangs.

BRIEF DESCRIPTION OF THE DRAWINGS

Other objects and advantages of the invention will become readily apparent to one skilled in the art from reading the following detailed description of the embodiments of the invention when considered in the light of the accompanying drawings, in which.

DESCRIPTION OF THE PREFERRED EMBODIMENTS

Figure 1:
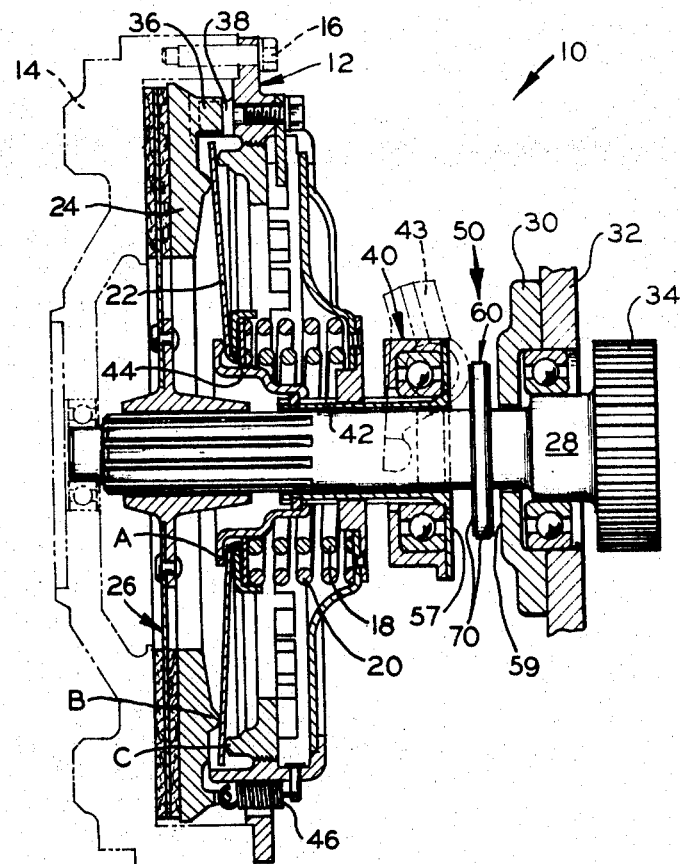
FIG. 1 is a vertical sectional view of a clutch embodying the present invention.

Referring now to FIG. 1, a normally engaged heavy-duty pull type friction clutch is shown generally at 10 for use with a non-synchronized transmission (not shown) and has a cover member 12 mounted to an engine flywheel 14 by means of a plurality of bolts 16 (only one shown). A pair of centrally located pressure springs 18 and 20 exert a force on a plurality of radially extending clutch release levers 22 so that spring pressure is increased by the lever ratio between inner, intermediate and outer fulcrum points shown generally at "A," "B" and "C," respectively. This multiplied force is transmitted to a pressure plate 24 and in turn to a driven disc 26 splined to the outer end of a rotatable transmission main gear driven shaft 28. The driven shaft 28 is piloted at its front end in the flywheel 14 and at its rearward end, by means of a bearing cap 30, in the front wall of a stationary transmission housing 32. The driven shaft 28 extends partially into the transmission housing 32 and carries an integral drive gear 34 for transmitting drive to the gearing (not shown) of a non-synchronized transmission. The pressure plate 24 is driven by drive lugs 36 extending from the pressure plate into drive slots 38 in the cover member 12.

A clutch release bearing shown generally at 40, is slidably disposed about the driven shaft 28 by means of a cylindrical sleeve 42 which is splined to the cover member 12 so as to be continuously rotated therewith and in turn, continuously rotate the release bearing with the cover member. The clutch release bearing is operated by a conventional yoke 43 through the clutch pedal linkage (not shown) and serves to release the clutch 10 by pulling the release bearing 40 away from the flywheel 14. This force is transmitted through the clutch release bearing 40 to sleeve 42 and therefrom to a retainer sleeve 44 which in turn compresses the pressure springs 18 and 20 and relieves the spring load on the pressure plate 24 simultaneously pulling the inner ends of the levers 22 away from the flywheel 14 so that the intermediate fulcrum point B, on the back face of the pressure plate 24, moves to the right, again in a direction away from the flywheel. A plurality of retraction springs 46 (only one of which is shown) then function to pull the pressure plate 24 away from the flywheel 14 to release the lockup between the driven disc 26 and the flywheel.

In order to aid in the gear shifting when a vehicle is stationary and enable a driver to shift a non-synchronized transmission more easily from first to reverse or from reverse to first without clashing or putting undue strain on the transmission gears, an improved clutch brake assembly is shown generally at 50.

IMPROVED CLUTCH BRAKE

Figure 2:
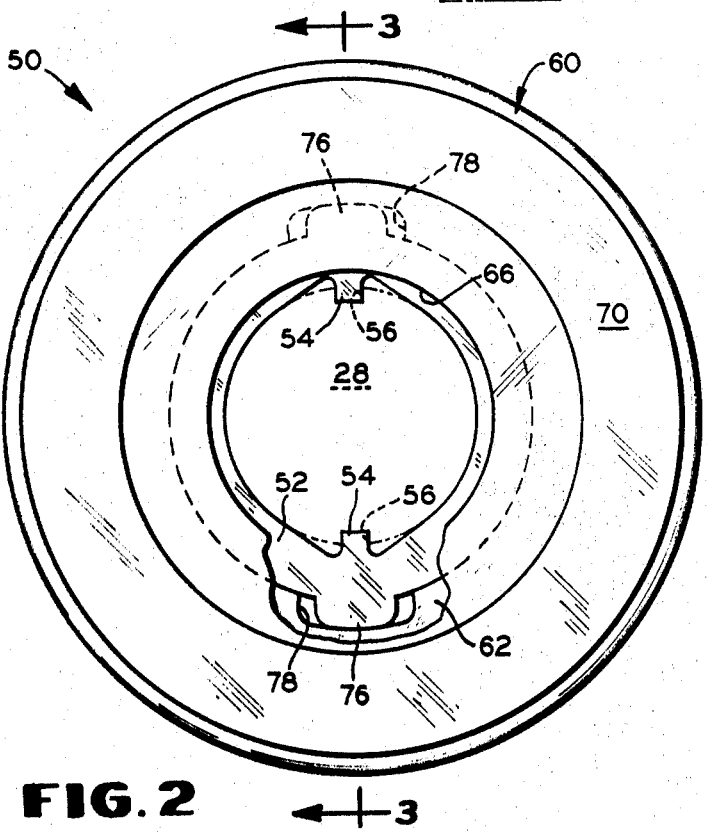
FIG. 2 is an enlarged right end view of the clutch brake shown in FIG. 1 with portions broken away to more clearly illustrate certain details of the invention.
Figure 3:
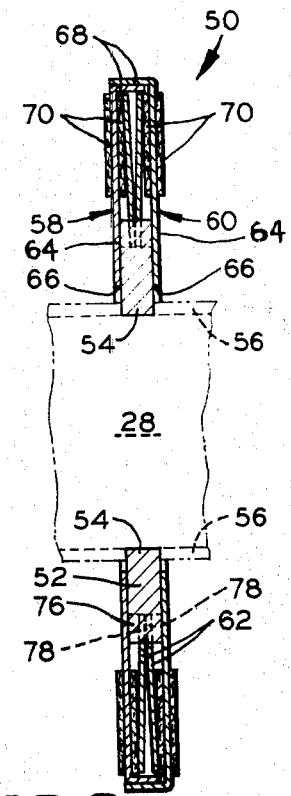
FIG. 3 is a vertical sectional view taken substantially along line 3—3 of FIG. 2.

The clutch brake assembly 50 is located between the clutch release bearing 40 and the transmission bearing cap 30 and, as best seen in FIGS. 2 and 3, the improved clutch brake assembly comprises a unitary assembly consisting of an inner brake section, an outer friction section and resilient means intermediate the sections for operatively connecting the same together so as to have both positive and limited torque capabilities. Briefly, the inner brake section comprises an annular ring-like brake washer 52 having a pair of opposed drive tangs 54—54 provided on its inner periphery for slidably and drivingly engaging opposed splines or keyways 56—56 formed on the outer periphery of the driven shaft 28. Thus, the brake washer 52 is drivingly connected to the rotatable driven shaft 28 for rotation therewith while being axially slidable thereon.

The outer friction section is adapted to be located between a first friction face 57 provided on the rear of the throw-out bearing 40 and a second friction face 59 formed on the front of the stationary bearing cap 30 and includes a pair of friction members 58-60 disposed on opposite sides of the brake washer 52 with the friction member 58 associated with the friction face 57 on the release bearing 40 and the friction member 60 associated with the friction face 59 on the bearing cap 30.

The intermediate resilient means includes a pair of Belleville washers 62—62 positioned between the friction members 58-60 in a preloaded condition so as to have a controlled frictional driving connection with the outer friction section while having a positive driving connection with the inner brake section. To this end the positive driving connection is in the form of a lost motion coupling connection consisting of a pair of opposed radially outwardly extending drive lugs 76—76 formed on the outer periphery of the brake washer 52 and cooperating opposed circumferentially elongated drive slots 78—78 (shown in FIG. 2) provided on the interior of the Belleville washers 62—62. Lost motion or limited free travel is obtained between the brake washer 52 and Belleville washers 62—62 by constructing the drive slots 78—78 of a greater width than the width of the mating drive lugs 76—76 so that the brake washer 52 is capable of limited rotational movement relative to the Belleville washers 62—62.

The Belleville washers 62—62 are dished-shape having their concave surfaces in face-to-face relationship so that their outer rim portions frictionally engage the inner friction facings 70—70 on friction members 58-60 while their inner peripheral portions abut and are positively drivingly connected to the brake washer 52 by engagement of the drive lugs 76—76 with drive slots 78—78.

Further, the Bellevilles are designed or chosen so as to have a controlled slip characteristic built into the unit thus providing a limited torque feature which has an exceptional advantage over prior clutch brake units. If desired, a single Belleville or wave washer can be used in place of the opposed Bellevilles to accomplish the desired result.

The slip (limited torque) feature is accomplished by having the Belleville washers 62—62 frictionally engage the outer friction section so that drive can be selectively transmitted from one to the other and positively engage the inner brake member through the lost-motion coupling connection so that the Belleville washers 62—62 can in turn transmit this drive to the inner brake section.

Referring now more particularly to the friction members 58 and 60 which make up the outer friction section, it will be seen that each consists of a stamped dished-shape cover plate 64 with a central opening 66 and an outer annular axially directed flange portion 68. Suitable friction facings 70 are securely bonded on the outer sides of each cover plate 64 so as to cooperate with the friction faces 57 and 59 on the release bearing 40 and bearing cap 30 respectively. While not essential, similar friction facings 70—70 are provided on the interior of the cover plates 64 for cooperating with the Belleville washers 62—62 as previously indicated to give added frictional characteristics.

In order to provide a unitary clutch brake assembly the axial flange portions 68 on the friction members 58 and 60 are constructed in such a manner as to fit one within the other in overlapping relationship so that the cover plate portions 64 of the friction members 58-60 are secured together and enclose the brake washer 52 and positively retain the opposed Belleville washers 62—62 in a pre-loaded condition within the space provided between the friction members 58-60 and the brake washer 52, thus providing a compact unitary clutch brake assembly. This connection at the flanges 68—68 can be made in any number of different ways, e.g., by riveting, press fit, rolling, etc. In addition, the flange construction may differ from that shown without departing from the invention, e.g., one of the flange portions 68 may be L-shaped with the opposed flange portion altered so as to be bent over the outer periphery of the L-shaped flange portion to securely attach the friction members 58-60 together.

OPERATION

To activate the clutch brake assembly 50, the driver merely presses the clutch pedal to the floorboard-beyond the normal clutch disengage position which brings the rear friction face 57 on the clutch release bearing 40 into contact with the outer friction facing 70 on the friction member 58 of clutch brake assembly 50 and urging the outer friction facing 70 of friction member 60 into contact with the front friction face 59 on the bearing cap 30. Thus, the friction members 58-60 move as a unit, and are loaded or compressed between the release bearing 40 and transmission bearing cap 30 and, due to the bearing cap 30 being stationary, will respond to slow down or stop rotation of the driven shaft 28 and clutch driven disc 26. With this the driver can then shift to a desired ratio, e.g., from first to reverse or from reverse to first, without clashing or putting undue strain on the gears.

In more detail now, when the clutch pedal is initially depressed, the yoke 43 rotates in a counterclockwise direction, as seen in FIG. 1, by means of the clutch pedal linkage (not shown). As the yoke 43 rotates it initially engages and applies a load to the release bearing 40 which, through the various operating parts of the main clutch described earlier, will cause the driving connection between the flywheel 14 and the driven disc 26 will be disengaged. In order to aid the operator of the vehicle in shifting the vehicle into another gear ratio or upshifting while the vehicle is moving, the inertia of the driven shaft 28 is braked or retarded. This is effected by further counterclockwise rotation of the yoke 43 which causes the load applied to the release bearing 40 to move the same further axially to the right toward the clutch brake assembly 50. This subsequent movement enables the brake washer 52 to move axially on the driven shaft 28 permitting the friction surface 57 on the release bearing 40 to engage the friction member 58 thereby moving the outer friction section rearwardly so that the friction member 50 moves into engagement with the front face 59 of the stationary bearing cap 30. Since the inner brake washer 52 is keyed for rotation with the driven shaft 28 and the resilient means or Belleville washers 62—62 operatively interconnect the brake washer 52 and friction section, this will cause a braking of the driven shaft 28, thus enabling the vehicle operator to quickly and easily shift the gears in the vehicle.

During the initial contact between the friction section and the stationary bearing cap 30, the engaging pressure will cause the clutch brake 50, as a unit, to momentarily slip relative to the bearing cap 30 until more loading pressure is applied by the release bearing 40 to the friction section. Under a normal application of load to the outer friction section by the release bearing 30, the frictional driving connection provided between the outer friction section and the resilient means responds through the positive driving connection provided between the resilient means and the inner brake section to retard rotation of the inner brake section and thereby retard rotation of the rotatable driven shaft 28 due to the driving connection provided by the tangs 54—54 and mating keyways 56—56 on the respective members.

The resilient means is designed to enable only a controlled amount of load to pass from the outer friction section and be applied to the tangs 54—54 on the inner brake section. When this predetermined load is exceeded the frictional driving connection between the resilient means and the outer friction section results in a slipping action taking place whereby no further increased load can pass from the outer friction to the tangs on the inner brake section.

The resilient means or Belleville washers 62-62 operate in such a manner as to positively control a predetermined torque value so the torque applied to the clutch brake assembly 50 never exceeds this value regardless of the pedal pressure or load applied by the operator to the yoke 43. Thus, the preload built into the resilient means (Belleville washers 62—62) functions to effect selective rotation of the outer friction section (friction members 58–60) with the driven shaft 28 through the inner brake section (washer 52) under what would be considered a normal torque load applied to the friction section by the clutch release bearing 40 by allowing the friction section to be compressed between the release bearing 40 and stationary bearing cap 30 and through the resilient means acting on the inner brake section operate to retard and stop rotation of the driven shaft 28 but, under abnormal torque loads (loads which exceed the preload) applied to the friction section by the release bearing 40, the capacity of the resilient means is such that the resilient means and in turn the inner brake section will slip relative to the outer friction section under the excessive load so only a predetermined load is capable of passing through the inner brake section to the drive tangs 54—54.

From the foregoing, it can be seen that the release bearing 40, in addition to controlling operation of the main clutch, also functions as an actuating means for the clutch brake assembly 50, since it selectively engages the outer friction section and applies a load thereto for moving the same into frictional engagement with the stationary bearing cap 30. Further, it will be evident that, when unloaded, the clutch brake assembly 50 is floatingly supported on the driven shaft 28 since the only positive connection is by means of the tangs 54 on the brake washer 52 engaging the keyways 56 on the driven shaft.

Sincere numerous changes from the embodiments disclosed may be made within the spirit and scope of the inventive concepts taught herein, it is intended that the invention not be limited to the specific embodiments shown and described but that the invention be given a scope consistent with the language of the following claims.

What is claimed is:

1. A clutch brake assembly for cooperating with a rotatable driven shaft and a stationary housing comprising,
   a. an inner brake section drivingly connected to the rotatable driven shaft for rotation therewith;
   b. an outer friction section movable into engagement with the stationary housing;
   c. an actuating means movable into engagement with the outer friction section for applying a load to the outer friction section to engage the same with the stationary housing for retarding rotation of the outer friction section;
   d. a resilient means positively connected to the inner brake section for transmitting rotation from the inner brake section to the resilient means and frictionally connected to the outer friction section for selectively transmitting rotation from the resilient means to the outer friction section;
   e. the resilient means providing a preload with respect to the outer friction section for retarding rotation of the inner brake section when the outer friction section is engaged by the actuating means but being free to slip relative to the outer friction section when the load applied by the actuating means exceeds the preload.

2. A clutch brake assembly as recited in claim 1, wherein the resilient means is located intermediate the inner brake section and the outer friction section.

3. A clutch brake assembly as recited in claim 1, wherein the resilient means includes at least one Belleville washer.

4. A clutch brake assembly as recited in claim 3, wherein the Belleville washer is positively coupled to the inner brake section by a lost-motion coupling connection.

5. A clutch brake assembly as recited in claim 4, wherein the lost-motion coupling connection includes at least one drive lug on the inner brake section and at least one mating circumferentially extending slot on the Belleville washer.

6. A clutch brake assembly as recited in claim 1, wherein the outer friction section includes a first friction element engageable by the actuating means and a second friction element engageable with the stationary housing.

7. A clutch brake assembly as recited in claim 6, wherein the first and second friction elements are spaced apart and secured together and the resilient means is preloaded therebetween.

8. A clutch brake assembly as recited in claim 7, wherein the Belleville washer and inner brake section are located in the space between the first and second friction elements and the friction elements enclose and retain the same to form a unitary assembly.

9. A clutch brake assembly as recited in claim 7, wherein the resilient means includes a pair of opposed Belleville washers.

10. A clutch brake as recited in claim 9, wherein the first and second friction elements have inner friction surfaces for engaging the opposed Belleville washers.

* * * * *

UNITED STATES PATENT OFFICE
CERTIFICATE OF CORRECTION

PATENT NO. : 3,763,977
DATED : October 9, 1973
INVENTOR(S) : William Howard Sink It is certified that error appears in the above-identified patent and that said Letters Patent are hereby corrected as shown below:

In Claim 8, Line 2, delete "Belleville washer" and insert -- resilient means -- therefor.

Signed and sealed this 10th day of June 1975.

(SEAL)
Attest:

RUTH C. MASON
Attesting Officer

C. MARSHALL DANN
Commissioner of Patents
and Trademarks